United States Patent Office 3,391,104
Patented July 2, 1968

3,391,104
LIGHT STABILIZED, POLY-α-OLEFIN
PLASTIC COMPOSITION
Raymond C. Harris and Gordon C. Newland, Kingsport,
Tenn., assignors to Eastman Kodak Company, Rochester, N.Y., a corporation of New Jersey
No Drawing. Continuation of application Ser. No.
269,745, Apr. 1, 1963. This application Nov. 14,
1966, Ser. No. 594,268
8 Claims. (Cl. 260—41)

ABSTRACT OF THE DISCLOSURE

A poly-α-olefin composition comprising a normally solid poly-α-olefin polymeric component and a light stabilizing amount of an organic pigment additive of the general formula:

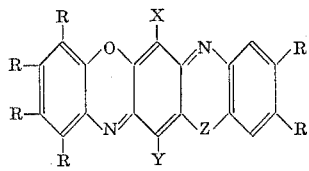

wherein X and Y are independently selected from the group consisting of hydrogen and halide radicals, Z is selected from the group consisting of oxygen or sulfur and each R is independently selected from the group consisting of hydrogen, hydroxyl, alkyl, substituted alkyl, nitro, halide, alkoxy, alkylthio, phenyl and halogenated phenyl.

---

This application is a continuation on U.S. application Ser. No. 269,745, filed Apr. 1, 1963, which in turn was a continuation-in-part of U.S. application Ser. No. 162,985, filed Dec. 28, 1961, both of which are now abandoned.

This invention relates generally to normally solid poly-α-olefin polymers and particularly to the problem of stabilizing them relative to the degradative effects of light.

Normally solid poly-α-olefin polymers such as the well known normally solid polyethylene and polypropylene polymers (commonly referred to merely as polyethylene and polypropylene) are thermoplastic, synthetic resins which have gained widespread use as materials of construction. However, as is also well known, normally solid poly-α-olefin polymers undergo a photochemical degradation when exposed to sunlight, particularly ultraviolet light, and air. This effect is frequently termed weathering. It appears to be a photooxidation process which causes rupture of the polymer chains and formation of carbonyl (=C=O) groups. As this degradation progresses, articles manufactured from these polymers tend to crack, become brittle and lose tensile strength to the extent of mechanical failure.

A general object of this invention is to provide a poly-α-olefin plastic composition wherein the poly-α-olefin polymeric component thereof is stabilized relative to the degradative effect of light.

A specific object of this invention is to provide a poly-α-olefin plastic composition comprising an additive effective to stabilize the poly-α-olefin polymer component of the composition against degradation by ultraviolet light.

These objects and others are achieved by this invention which is based on our discovery that certain organic pigments, but not all organic pigments, are effective light stabilizers for normally solid poly-α-olefin polymers.

In summary, this invention comprises a light stabilized, poly-α-olefin plastic composition consisting essentially of (1) a normally solid, normally light unstable, poly-α-olefin polymeric component and (2) an organic pigment additive that is a member of the group consisting of triphenodioxazines of the general formula:

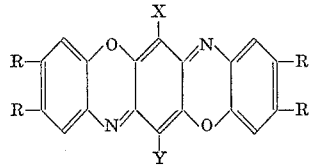

isophenoxazones of the general formula:

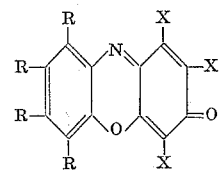

triphenoxathiazines of the general formula:

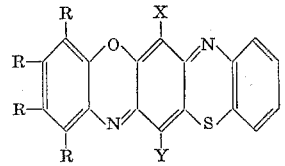

wherein X and Y are independently selected from the group consisting of hydrogen and halide radicals, and R in each case is independently selected from the group consisting of the radicals: hydrogen, hydroxyl, alkyl, substituted alkyl, amino, alkylamino, dialkylamino, nitro, halide, alkoxy, alkylthio, and phenyl. In addition, two adjacent R's may be bonded to each other to form a cyclic member of the group of aromatic and heterocyclic rings; and 1,4-benzoquinones of the general formula:

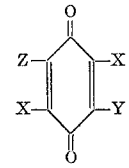

wherein X in each case is independently selected from the group of hydrogen and halide radicals, and Y and Z are selected from the group consisting of amino, alkylamino, alkyl, substituted alkyl, arylamino, substituted arylamino, alkoxy, phenoxy, halide and nitro radicals with at least one of said Y and Z radicals containing a nitrogen atom.

The poly-α-olefin polymeric component of the composition of this invention consists essentially of at least one poly-α-olefin polymer which is a member of the group of high and low density, normally solid, homopolymers and copolymers of α-mono-olefins having 2–10 carbon atoms. It can also consist essentially of a blend of poly-α-olefin polymers that are members of this group. Examples of poly-α-olefin polymers of this group are the homopolymers and copolymers of ethylene, propylene, butene-1, isobutylene, pentene-1, 2-methylbutene-1, 3-methylbutene-1, hexene-1, heptene-1, octene-1, nonene-1, decene-1, 4-methylpentene-1, 4-methylhexene-1, 5-ethylhexene-1, 6-methylheptene-1, 6-ethylheptene-1, and the like. While homopolymers and copolymers of styrene and allylbenzene may not technically be considered members of the olefin class it is to be understood that they may also be employed. Processes for preparing these polymers are well known and described in detail in the prior art. See for example, the U.S. patent, No. 2,912,424, of Cash and the U.S. patent, No. 2,917,500, of Hagemeyer et al. which describe typical catalytic processes for the preparation of homopolymers and copolymers of these poly-α- olefins. In general, the poly-α-olefin polymers of this invention are thermoplastic, normally solid synthetic resins having average molecular weights of at least about nine thousand. In the average molecular weight range from about nine thousand to about twelve thousand the poly-α-olefin polymers generally are wax-like at room temperature while above an average molecular weight of about twelve thousand these poly-α-olefin polymers have greater consistencies.

The organic pigment additive of this invention functions to stabilize the poly-α-olefin polymeric component relative to the adverse effects of ultraviolet light. It is characterized not only by color but also by compatibility with the polymeric component in that the resulting plastic compositions do not "bloom" or exude the pigment. Typical examples of organic pigments within the preceding formulas are listed as follows, along with the color of each and their approximate general rating of stabilization effectiveness for poly-α-olefin polymeric components generally (a stabilization rating of 1 indicates no stabilization effect), to wit:

| Organic Pigment | Color | Approximate General Stabilization Rating |
| --- | --- | --- |
| 6,14-dichloro-2,10-dimethylbisthiazole [4,5-b: 4',5'-m]-triphenodioxazine. | Dark Purple | 2 |
| 6,13-dichloro-9-dimethylamino methyl-triphenodioxazine. | Blue-violet | 2 |
| 6,13-dichloro-3,10-diaminotripheno-dioxazine. | Purple | 3 |
| 6,13-dichloro-3,10-diphenyltripheno-dioxazine. | Red-purple | 3 |
| 6,13-dichloro-3,10-bis(trifluoromethyl) triphenodioxazine. | Red | 8 |
| 3,10-dihydroxytriphenodioxazine | Amber | 13 |
| Triphenodioxazine | do | 16 |
| 6,13-dichlorotriphenodioxazine | do | 17 |
| 2-nitro-10-trifluoromethyltripheno-dioxazine. | Red-violet | 23 |
| 3,6,10,13-tetrachlorotriphenodioxazine | Red | 30 |
| 6,13-dichloro-2,9-dinitrotriphenodi-oxazine. | Purple | 30 |
| 6,13-dichloro-3,10-dinitrotriphenodi-oxazine. | do | 39 |
| 6,13-dichloro-2,9-dinitro-3,10-dimethyl-triphenodioxazine. | Red-brown | 40 |
| 6,13-dichloro-2,9-diphenyltriphenodi-oxazine. | do | 55 |
| 4-chloro-7-trifluoromethyl-3H-iso-phenoxazine-3-one. | Red | 20 |
| 1,2,4-trichloro-7-nitro-3H-isophen-oxazine-3-one. | Reddish-brown | 34 |
| 6,13-dichloro-3-nitrotriphenoxathiazine | Red | 9 |
| 2,5-dichloro-3,6-diamino-1,4-benzo-quinone. 9 | Brown | 3 |
| 2,5-dichloro-3,6-bis(o-anisidino)-1,4-benzoquinone. | Green-brown | 6 |
| 2,5-dichloro-3,6-bis(p-octylanilino)-1,4-benzoquinone. | Amber | 10 |

The organic pigments of this invention are readily prepared from readily available reactants by procedures well known in the art. This is apparent from the following instructions for the preparation of certain preferred organic pigments of this invention. In these instructions quantities given are in parts by weight except as otherwise indicated.

PREPARATION OF 2,5-DICHLORO-3,6-DIANILINO-1,4-BENZOQUINONE

Admix 49.2 parts (0.2 molecular equivalent) chloranil, 37.2 parts (0.4 molecular equivalent) aniline, 54.0 parts (0.66 molecular equivalent) anhydrous sodium acetate and 474 parts absolute ethanol. Heat the mixture to vigorous reflux and reflux for 2½ hours. Allow the resulting reaction mixture to stand at room temperature for 12 hours whereby a solid precipitate is formed. Filter the reaction mixture and wash the filter cake with warm water and then with ethanol. Dry the washed filter cake at 60° C. whereby the desired product is obtained. The product, 2,5-dichloro-3,6-dianilino-1,4-benzoquinone is obtained at a typical yield of 69 parts (0.19 molecular equivalent) which is equivalent to about 96% of the theoretical yield.

PREPARATION OF 6,13-DICHLOROTRIPHENODI-OXAZINE

Admix 53.85 parts (0.15 molecular equivalent) of 2,5-dichloro-3,6-dianilino-1,4-benzoquinone (obtained as by the preceding set of instructions), 360 parts of dry nitrobenzene, 10.50 parts (0.05 molecular equivalent) of phosphorus pentachloride and 5.00 parts (0.04 mole) benzoyl chloride. Heat the resulting mixture with stirring until a temperature of 190° C. is attained. Stir the mixture for 7½ hours at 190–200° C. Cool slowly to room temperature the resulting reaction mixture. Filter the reaction mixture. Wash the filter cake first with nitrobenzene and then thoroughly with ethanol. Slurry the filter cake in warm water and refilter. Wash the filter cake with water and then with ethanol. Dry the washed filter cake at 60° C. The dried cake is the product: 6,13-dichlorotriphenodioxazine. A typical yield of the product, a purple pigment, is 26 parts (0.07 molecular equivalent).

PREPARATION OF 6,13-DICHLORO-3,10-DINITRO-TRIPHENODIOXAZINE

Admix 24.6 parts (0.1 molecular equivalent) chloranil, 35.0 parts (0.23 molecular equivalent) 2-amino-5-nitrophenol, 20.0 parts (0.23 mole) anhydrous sodium acetate and 138 parts of anhydrous ethanol. Heat the resulting mixture slowly to reflux and then vigorously reflux the mixture for 10 hours, whereby a reaction mixture is formed. Let the reaction mixture stand for 12 hours at room temperature, whereby a precipitate is formed. Filter the reaction mixture to separate therefrom the precipitate. Thoroughly wash the filter cake with ethanol and then with water. Dry the washed filter cake at 60° C. The dried filter cake is the desired product 6,13-dichloro-3,10-dinitrotriphenodioxazine. A typical yield of this product, a purple pigment, is 41.8 parts (0.1 molecular equivalent). The product has a melting point greater than 300° C.

PREPARATION OF 1,2,4-TRICHLORO-7-NITRO-3H-ISOPHENOXAZINE-3-ONE

Admix 28.0 parts (0.11 molecular equivalent) chloranil, 15.4 parts (0.1 molecular equivalent) 2-amino-5-nitrophenol, 10.0 parts (0.12 molecular equivalent) anhydrous sodium acetate and 197 parts of anhydrous ethanol. Stir the resulting mixture one hour at room temperature and then let stand 12 hours at room temperature, whereby a precipitate forms. Remove the precipitate by filtration, wash the precipitate with water and ethanol, and dry. The washed precipitate is the desired crude product. A typical yield of the dry crude product is 34 parts. Admix the crude product in warm glacial acetic acid and then cool whereupon a bright red crystalline material is obtained. Filter the crystalline material from the galcial acetic acid, wash the filter cake with water and ethanol and then dry. The dry product, a red pigment, is 1,2,4-trichloro-7-nitro-3H-isophenoxazine-3-one. It has a typical melting point at 237–9° C. A typical analysis of the product is:

Calculated, percent by weight: C, 41.7; H, 0.87; N, 8.11; O, 18.52; Cl, 30.78. Found, percent by weight: C, 41.62; H, 1.06; N, 8.10; O, 18.9; Cl, 30.66.

PREPARATION OF 6,13-DICHLORO-3-NITRO-TRIPHENOXATHIAZINE

To 12.5 parts (0.1 molecular equivalent) of o-aminothiophenol in 78.9 parts of anhydrous ethanol slowly add at the same time 5.4 parts (0.05 molecular equivalent) of sodium methoxide and 78.9 parts of anhydrous ethanol. Stir the resulting mixture at room temperature for 1 hour and then for an additional hour at 60° C. Cool the mixture to room temperature. Add to the mixture 2.6 parts (0.01 molecular equivalent) of chloranil and 197 parts of anhydrous ethanol and stir while increasing the temperature over a period of two hours to 45° C. Continue stirring for 1½ hours at 45° C. and then let stand overnight at room temperature. Filter the reaction mixture thus formed. Wash the filter cake, first with water and then thoroughly with ethanol. Air dry the filter cake at 60° C. The dry filter cake is the intermediate 1,2,4-trichloro-3H-phenothiazine-3-one. A typical yield of this compound under these conditions is 27 parts (0.09 molecular equivalent).

Add 9.37 parts (0.03 molecular equivalent) of 1,2,4-trichloro-3H-phenothiazine-3-one to 78.9 parts of anhydrous ethanol and heat to boiling. Then add in small portions 5 parts (0.06 molecular equivalent) of sodium acetate and a solution of 4.62 parts (0.02 molecular equivalent) of 2-amino-5-nitrophenol in 39.4 parts of anhydrous ethanol. Reflux the resulting reaction mixture for 24 hours. Cool the refluxed mixture to 15° C. and filter off the precipitate formed therein. Thoroughly wash the precipitate with water and then with ethanol. Dry the precipitate at 60° C. whereby there is obtained the desired product 6,13-dichloro-3-nitrophenoxathiazine. This product, obtained as a dark powder, dissolves in concentrated sulfuric acid to give a bright blue color.

PREPARATION OF 2,5-DICHLORO-3,6-BIS(p-OCTYLANILINO)-1,4-BENZOQUINONE

Admix 24.6 parts (0.1 molecular equivalent) of chloranil, 41.0 parts (0.2 molecular equivalent) of p-octylaniline, 27.0 parts (0.13 molecular equivalent) of anhydrous sodium acetate and 237 parts of absolute ethanol. Heat the mixture to reflux and reflux for about 3.5 hours, thereby forming a reaction mixture. Cool the reaction mixture to about 40° C., whereby a solid is precipitated. This solid is the desired product. Filter the product from the reaction mixture and then wash it, first with ethanol and then with water. Suck it fairly dry and then dry at 60° C. The product, 2,5-dichloro-3,6-bis(p-octylanilino)-1,4-benzoquinone, is characterized by a bright blue color in concentrated sulfuric acid. A typical analysis is:

Calculated, percent by weight: C, 69.96; H, 7.6; Cl, 12.18. Found, percent by weight: C, 69.46; H, 7.13; Cl, 12.06.

PREPARATION OF 2,5-DICHLORO-3,6-BIS(o-ANISIDINO)-1,4-BENZOQUINONE

Admix 24.6 parts (0.1 molecular equivalent) of chloranil, 24.6 parts (0.2 molecular equivalent) of o-anisidino, 27.0 parts (0.13 molecular equivalent) of anhydrous sodium acetate and 300 parts of absolute ethanol. Heat the mixture to reflux and reflux for about 3.5 hours, forming thereby a reaction mixture. Cool the reaction mixture to room temperature, whereby a precipitate is formed. Filter the reaction mixture and wash the filter cake with ethanol and then with water. After the water has drained from the filter cake, dry the filter cake at 60° C. The dry filter cake is the desired product 2,5-dichloro-3,6-bis(o-anisidino)-1,4-benzoquinone.

Concentration of the organic pigment additive in the poly-α-olefin plastic composition of this invention depends generally upon the extent of light stabilization desired. This in turn depends upon many variables, including the end use of the poly-α-olefin plastic composition. However, for most purposes a concentration in a range from about 0.1 to about 10% by weight of the poly-α-olefin polymeric component is an effective light stabilizing concentration.

The plastic compositions of this invention are prepared by incorporating the organic pigment additive into the poly-α-olefin polymeric component. Generally such incorporation is performed by any one of a number of well known methods, such as roll compounding, extrusion, solvent mixing and the like. For example, such incorporation can be performed by heating or otherwise softening the poly-α-olefin polymeric component to a workable consistency and then working in as by roll compounding the organic pigment additive of this invention until a substantially uniform mixture or dispersion is obtained.

The resulting plastic compositions are cast or molded into the desired article or articles such as, for example, pellets, sheeting, films, bars, filaments, specially shaped structural elements and the like as by conventional casting and molding techniques which include extrusion, blow molding and the like.

This invention is further illustrated by the following examples of various aspects thereof, including specific embodiments. Unless otherwise indicated, this invention is not limited to these specific embodiments.

Example 1

This example illustrates several specific embodiments of the polyethylene plastic composition of this invention, their preparation and typical light stability results obtained on testing them for light stability.

In the case of each one of the organic pigment additives in the Additive column of the following Table I, incorporate by roll compounding one part by weight of the additive into 100 parts of a conventional polyethylene having a density of 0.92. Hold the rear roll of the roll compounder at 220° F. and the front roll at 270° F. for a milling time of 4 minutes. At the end of this time, compression mold the roll mix into flat plates 0.048 inch thick.

In order to test the light stability of these embodiments subject 100 parts of the same polyethylene without a light stabilizing additive to four minutes of milling on the roll compounder with the rear roll at 220° F. and the front roll at 270° F. Then compression mold the milled polyethylene into a flat plate 0.048 inch thick. Expose outdoors this plate together with the flat plates of these embodiments. After a period of time measure the carbonyl content of each plate by infrared absorption at 5.82 microns. A carbonyl content of a polyethylene composition containing an additive less than that shown by the polyethylene without a light stabilizing additive indicates the additive has a light stabilizing effect on the polyethylene component of the composition. Typical test results as ascertained from plates exposed outdoors at Kingsport, Tenn., for 95 days are set forth in the following Table I.

TABLE I

| Additive: | Relative carbonyl content |
|---|---|
| None | 34 |
| 6,13-dichloro-3,10-dinitrotriphenodioxazine | 23.4 |
| 2,5 - dichloro-3,6-bis(p-octylanilino)-1,4-benzoquinone | 11.2 |
| 6,13-dichlorotriphenodioxazine | 4.1 |
| 6,13 - dichloro - 3,10 - diphenyltriphenodioxazine | 4.0 |

It can be seen from Table I that each one of the four organic pigments of this invention are effective in light stabilizing polyethylene. Typically, however, 6,13-dichlorotriphenodioxazine and 6,13-dichloro - 3,10 - diphenyltriphenodioxazine are substantially more effective than the other two additives wherefore, polyethylene compositions containing 6,13-dichlorotriphenodioxazine and 6,13-dichloro-3,10-diphenyltriphenodioxazine are preferred.

Example 2

This example illustrates a number of specific embodiments of the polypropylene plastic compositions of this invention, their preparation and typical light stability test results.

Relative to each additive listed in the Additive column of the following Table II dissolve in 2500 parts by weight of 1,2,3,4-tetrahydronaphthalene solvent 100 parts by weight of a conventional polypropylene polymer having a melt index of 0.90, forming thereby a 4% dope of the polymer. Admix with the dope 5 parts by weight of the additive and stir the resulting mixture for 30 minutes at 145° C., whereby the additive is uniformly incorporated in the dope. Cast the dope containing the additive on a ferrotype plate heated to 143° C. and evaporate the solvent therefrom. Usually about 10 minutes is required for the solvent to completely evaporate. The film which remains is about 0.003 inch thick. Quench the film in cold water and peel it from the ferrotype plate.

For the purpose of determining the light stability of the films prepared by the foregoing procedure prepare a film of the same polypropylene polymer but without a light stabilizing additive. Do this by dissolving in 2500 parts by weight of 1,2,3,4-tetrahydronaphthalene solvent 100 parts by weight of the polypropylene polymer, forming thereby a 4% dope of the polymer. Stir the dope for 30 minutes at 145° C. Cast the dope on a ferrotype plate heated to 143° C. and evaporated therefrom the solvent. After evaporation of the solvent, there remains a film of about 0.003 inch thick. Quench the film in cold water and peel it from the ferrotype plate.

To determine the light stability of the films cut test specimens 2.5 inches by 0.5 inch from the film without an additive and the films containing the additives. Expose until they become brittle the thus obtained test specimens to artificial weathering in a modified Atlas Twin-Arc Weather-Ometer [Anal. Chem., 25, 460 (1953)]. The state of brittleness is deemed to be reached when the film specimen breaks on one hard crease with the exposed side of the film on the outside of the crease. On the basis of these exposure tests determine the light stabilization rating of each polypropylene plastic composition and thus of the corresponding additive involved. Stabilization rating is the ratio of the exposure time required for the development of brittleness in the film with additive to the exposure time required for the development of brittleness in the film without an additive. A stabilization rating greater than 1 signifies that the polymeric component is light stabilized, the extent of light stabilization being in direct proportion to the numerical value of the rating. A stabilization rating equal to 1 signifies no light stabilization effect.

Typical light stabilization ratings of the thus prepared and tested polypropylene plastic compositions and thus of the corresponding additives are:

TABLE II

| Additive: | Light stabilization rating |
|---|---|
| None | 1 |
| 6,13 - dichloro - 9 - dimethylaminomethyltriphenodioxazine | 2 |
| 6,13-dichloro-3,10-diaminotriphenodioxazine | 3 |
| 6,13-dichloro-3,10-diphenyltriphenodioxazine | 3 |
| 2,5-dichloro-3,6-diamino-1,4-benzoquinone | 3 |
| 2,5-dichloro-3,6-bis(o-anisidino)-1,4-benzoquinone | 6 |
| 6,13-dichloro-3-nitrotriphenodioxathiazine | 9 |
| 2,5 - dichloro - 3,6 - bis(p - octylanilino)-1,4-benzoquinone | 10 |
| 6,13-dichlorotriphenodioxazine | 17 |
| 6,13-dichloro-3,10-dinitrotriphenodioxazine | 25 |
| 6,13-dichloro-2,9-dinitrotriphenodioxazine | 30 |
| 3,6,10,13-tetrachlorotriphenodioxazine | 30 |
| 1,2,4-trichloro-7-nitro-3H-isophenoxazine-3-one | 34 |
| 6,13-dichloro-2,9-diphenyltriphenodioxazine | 55 |

Thus, each one of the additives of Table II is effective to light stabilize polypropylene. However, certain ones of the additives of Table II are so highly effective that they are preferred over the others. These preferred additives are:

6,13-dichloro-3-nitrotriphenodioxathiazine
2,5-dichloro-3,6-bis(p-octylanilino)-1,4-benzoquinone
6,13-dichlorotriphenodioxazine
6,13-dichloro-3,10-dinitrotriphenodioxazine
6,13-dichloro-2,9-dinitrotriphenodioxazine
3,6,10,13-tetrachlorotriphenodioxazine
1,2,4-trichloro-7-nitro-3H-isophenoxazine-3-one
6,13-dichloro-2,9-diphenyltriphenodioxazine Example 3

This example illustrates a number of other specific embodiments of the poly-α-olefin plastic compositions of this invention, their preparation and typical light stability results obtained on testing them for light stability.

For each of the poly-α-olefin polymer-additive combinations specified in the following Table III prepare a 4% dope of the polymer by dissolving 100 parts by weight of the polymer in 2500 parts by weight of the solvent: 1,2,3,4-tetrahydronaphthalene. In each case add 5 parts by weight of the additive to the dope and stir for 1 hour at 145° C. Then cast the dope on a ferrotype plate heated to 143° C. and permit the solvent to evaporate. Usually about 10 minutes is required for the evaporation. When the solvent has evaporated a film about 0.003 inch in thickness remains. Quench the film in cold water and peel it from the plate.

In order to provide a basis for determining the light stability of the films prepared by the foregoing procedure prepare in the case of each poly-α-olefin polymer a film of the polymer but without an additive. Do this by dissolving in 2500 parts by weight of the solvent 1,2,3,4-tetrahydronaphthalene 100 parts by weight of the polymer, forming thereby a 4% dope. Stir the dope for 30 minutes at 145° C. Cast the dope on a ferrotype plate heated to 143° C. and let the solvent evaporate. After evaporation of the solvent is complete (about 10 minutes), quench with cold water the film which remains and which is about 0.003 inch thick, and peel the film from the plate.

To determine the light stability of the films, cut test specimens 2.5 inches by 0.5 inch from the films with additives and from the films without additives. Expose these test specimens in the apparatus of Example 2 and determine thereby the hours of exposure required for development of embrittlement. Typical results are given in the following Table III.

TABLE III

| Poly-α-Olefin Polymer | Additive | Exposure Hours Required for Embrittlement |
|---|---|---|
| Poly(3-methylbutene-1) | None | 19 |
| Do | 6,13-dichloro-3,10-diphenyl-triphenodioxazine | 70 |
| Do | 3,6,10,13-tetrachlorotriphenodioxazine | 160 |
| Do | 6,13-dichloro-2,9-dinitrotriphenodioxazine | 170 |
| Do | 1,2,4-trichloro-7-nitro-3H-isophenoxazine-3-one | 190 |
| Poly(4-methylpentene-1) | None | 16 |
| Do | 3,6,10,13-tetrachlorotriphenodioxazine | 140 |
| Do | 6,13-dichloro-2,9-dinitrotriphenodioxazine | 144 |
| Do | 1,2,4-trichloro-7-nitro-3H-isophenoxazine-3-one | 160 |
| Polystyrene | None | 19 |
| Do | 6,13-dichloro-2,9-dinitrotriphenodioxazine | 170 |
| 90/10 Propylene/1-butene copolymer | None | 22 |
| Do | 6,13-dichloro-2,9-dinitrotriphenodioxazine | 640 |
| 80/20 Propylene/1-butene copolymer | None | 18 |
| Do | 6,13-dichloro-2,9-dinitrotriphenodioxazine | 590 |

Thus, the organic pigments of this invention are effective light stabilizers for the poly-α-olefin polymers within the concepts of this invention.

One feature of advantage of the poly-α-olefin plastic composition of this invention is that in general the organic pigment at a concentration in a range from about 0.1 to about 10% by weight of the poly-α-olefin polymeric component is compatible with the poly-α-olefin polymeric component.

Another feature of advantage of the poly-α-olefin plastic composition of this invention is the fact that it has a color and a color other than black.

Other features and advantages of this invention will be apparent to those in the exercise of ordinary skill in the art after reading the foregoing disclosure. While this invention has been described in considerable detail relative to certain embodiments thereof, variations and modifications of these embodiments can be effected within the spirit and scope of this invention as disclosed and claimed.

We claim:
1. A light stabilized, plastic composition comprising: a normally solid, light unstable, polymeric component selected from the group consisting of poly-alpha-olefin, polystyrene, and poly-allylbenzene and at an effective light stabilizing concentration, an organic pigment additive of the general formula:

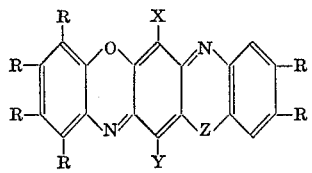

wherein X and Y are independently selected from the group consisting of hydrogen and halide radicals, Z is selected from the group consisting of oxygen or sulfur and each R is independently selected from the group consisting of hydrogen, hydroxyl, alkyl, substituted alkyl, nitro, halide, alkoxy, alkylthio, and phenyl.

2. A light stabilized, plastic composition comprising: a normally solid, light unstable, polymeric component selected from the group consisting of poly-alpha-olefin, polystyrene, and poly-allylbenzene and at a concentration in a range from about 0.1 to about 10% by weight of said polymeric component an organic pigment additive as defined in claim 1.

3. The plastic composition of claim 2 wherein said polymeric component is selected from the group consisting of polyethylene and polypropylene.

4. The plastic composition defined in claim 1 wherein said organic pigment additive is selected from the group consisting of 6,13-dichloro-3,10-bis(trifluoromethyl)triphenodioxazine, 3,10 - dihydroxytriphenodioxazine, triphenodioxazine, 6,13-dichlorotriphenodioxazine, 2-nitro-10 - trifluoromethyltriphenodioxazine, 3,6,10,13 - tetrachlorotriphenodioxazine, 6,13 - dichloro - 2,9 - dinitrotriphenodioxazine, 6,13 - dichloro - 3,10 - dinitrotriphenoldioxazine, 6,13-dichloro-2,9 - dinitro - 3,10 - dimethyltriphenodioxazine and 6,13-dichloro-2,9-diphenyltriphenodioxazine.

5. The plastic composition defined in claim 2 wherein said organic pigment additive is 3,6,10,13-tertachlorotriphenodioxazine.

6. The plastic composition defined in claim 2 wherein said organic pigment additive is 6,13 - dichloro - 2,9-dinitrotriphenodioxazine.

7. The plastic composition defined in claim 2 wherein said organic pigment additive is 6,13 - dichloro - 3,10-dinitrotriphenodioxazine.

8. The plastic composition defined in claim 2 wherein said organic pigment additive is 6,13 - dichloro - 2,9-dinitro-3,10-dimethyltriphenodioxazine.

References Cited
UNITED STATES PATENTS

| | | | |
|---|---|---|---|
| 3,022,298 | 2/1962 | Mory et al. | 260—41 |
| 3,167,441 | 1/1965 | Pugin | 260—41 |

OTHER REFERENCES

Noller, Chemistry of Organic Compounds, W. B. Saunders Co., Philadelphia, 1951, p. 43.

DONALD E. CZAJA, *Primary Examiner.*

M. J. WELSH, *Assistant Examiner.*